US009947027B2

United States Patent
Smereka et al.

(10) Patent No.: US 9,947,027 B2
(45) Date of Patent: Apr. 17, 2018

(54) SYSTEM AND METHOD FOR PROVIDING TARGETED ADVERTISEMENTS AND GEOLOCATION INFORMATION TO AN OPERATOR OF A VEHICLE

(71) Applicant: MYINE ELECTRONICS, INC., Ferndale, MI (US)

(72) Inventors: Scott W. Smereka, Warren, MI (US); Donald J. Ebben, Novi, MI (US); Jacob R. Sigal, Ferndale, MI (US)

(73) Assignee: MYINE ELECTRONICS, INC., Ferndale, MI (US)

( * ) Notice: Subject to any disclaimer, the term of this patent is extended or adjusted under 35 U.S.C. 154(b) by 330 days.

(21) Appl. No.: 14/648,557

(22) PCT Filed: Nov. 21, 2013

(86) PCT No.: PCT/US2013/071210
§ 371 (c)(1),
(2) Date: May 29, 2015

(87) PCT Pub. No.: WO2014/085186
PCT Pub. Date: Jun. 5, 2014

(65) Prior Publication Data
US 2015/0302480 A1 Oct. 22, 2015

Related U.S. Application Data

(60) Provisional application No. 61/731,863, filed on Nov. 30, 2012.

(51) Int. Cl.
*G06Q 30/00* (2012.01)
*G06Q 30/02* (2012.01)
(Continued)

(52) U.S. Cl.
CPC ..... *G06Q 30/0267* (2013.01); *G06Q 30/0201* (2013.01); *G06Q 30/0205* (2013.01);
(Continued)

(58) Field of Classification Search
CPC .................................................. G06C 30/0267
See application file for complete search history.

(56) References Cited

U.S. PATENT DOCUMENTS

| | | | | |
|---|---|---|---|---|
| 8,712,368 B2* | 4/2014 | Moser | | H04W 4/22 455/26.1 |
| 2002/0194595 A1* | 12/2002 | Miller | | H04H 20/10 725/36 |

(Continued)

OTHER PUBLICATIONS

Hamdy et al., "Low bit rate high quality audio coding with combined harmonic and wavelet representations", Proceedings of the 1996 IEEE Int'l Conf. on Acoustics, Speech, and Signal Processing, vol. 2, pp. 1045-1048, May 1996.*

(Continued)

*Primary Examiner* — Bennett M Sigmond
*Assistant Examiner* — Scott C Anderson
(74) *Attorney, Agent, or Firm* — Stephen T. Olson; Harness, Dickey & Pierce, P.L.C.

(57) ABSTRACT

A system is disclosed for inserting stored advertising content into broadcast content being played over an audio system. The system may have a smartphone in wireless communication with the audio system which runs an application relating to a specific broadcast station that is broadcasting the broadcast content. The audio system may have a processing system for detecting breaks in program content that forms part of the broadcast content. The audio system may further be configured to obtain predetermined advertisements and to play back the predetermined advertisements over the audio system during each break in the program content, in place of advertisements contained in the broadcast content.

21 Claims, 7 Drawing Sheets

(51) Int. Cl.
*H04W 4/02* (2018.01)
*H04W 4/06* (2009.01)
*H04W 4/00* (2018.01)

(52) U.S. Cl.
CPC ..... *G06Q 30/0261* (2013.01); *G06Q 30/0266* (2013.01); *G06Q 30/0276* (2013.01); *H04W 4/021* (2013.01); *H04W 4/06* (2013.01); *H04W 4/008* (2013.01); *H04W 4/02* (2013.01)

(56) References Cited

U.S. PATENT DOCUMENTS

| | | | | |
|---|---|---|---|---|
| 2005/0039135 | A1* | 2/2005 | Othmer | H04M 1/72552 715/774 |
| 2007/0136742 | A1 | 6/2007 | Sparrell | |
| 2008/0227467 | A1* | 9/2008 | Barnes | G06Q 30/0259 455/456.2 |
| 2010/0267406 | A1* | 10/2010 | Srinivasan | H04H 20/30 455/509 |
| 2011/0296472 | A1* | 12/2011 | Soldan | H04N 5/4401 725/81 |
| 2012/0033140 | A1* | 2/2012 | Xu | H04N 21/42224 348/734 |
| 2012/0252484 | A1 | 10/2012 | Andrews | |
| 2012/0264415 | A1 | 10/2012 | Baldini et al. | |
| 2012/0272145 | A1 | 10/2012 | Ryan et al. | |
| 2012/0278192 | A1* | 11/2012 | Shirron | G06Q 20/123 705/26.1 |
| 2013/0238418 | A1* | 9/2013 | Malca | G06Q 30/0273 705/14.41 |

OTHER PUBLICATIONS

International Search Report and Written Opinion for PCT/US2013/071210, dated Feb. 20, 2014; ISA/US.

* cited by examiner

SYSTEM AND METHOD FOR PROVIDING TARGETED ADVERTISEMENTS AND GEOLOCATION INFORMATION TO AN OPERATOR OF A VEHICLE

CROSS-REFERENCE TO RELATED APPLICATIONS

This application is a U.S. National Phase Application under 35 U.S.C. 371 of International Application No. PCT/US2013/071210 filed on Nov. 21, 2013 and published in English as WO 2014/085186 A1 on Jun. 5, 2014. This application claims the benefit of U.S. Provisional Application No. 61/731,863, filed on Nov. 30, 2012. The entire disclosures of the above applications are incorporated herein by reference.

FIELD

The present disclosure relates to systems and methods for providing stored advertising content on an electronic device to a user, and more particularly to systems and methods for selectively providing items of stored advertising content to a user travelling in a mobile platform, such as a motor vehicle, where the selectively provided items of stored advertising content are selected based on a real time location of the mobile platform during specific portions of a wireless broadcast being received by the user, and where the user is able to accept a selected one of the items of stored advertising content by providing a user input, and where directions are then automatically provided to the user to direct the user to an establishment associated with the selected item of stored advertising content.

BACKGROUND

The statements in this section merely provide background information related to the present disclosure and may not constitute prior art.

Presently there is a growing interest on the part of advertisers in providing targeted advertising to individuals. However, traditionally targeted advertising has been based primarily on the characteristics of the target audience. Important factors traditionally have been the gender of the audience that the advertiser is trying to reach, the age range of members of the targeted audience, and the education level of the targeted audience, just to name a few factors.

A limitation that has existed in delivering advertising content to consumers is the inability to time the delivery of the content at those times where the consumer is most likely to take advantage of an advertisement or, put differently, to act on an advertisement. This is particularly so when the consumer is travelling in a motor vehicle such as an automobile or truck and listening to content being broadcast from a radio station. In such a situation, the consumer, being in his/her vehicle, is potentially more likely to act on an advertisement that he/she learns about, for example a one-day sale at a retailer, than he/she might otherwise be if the consumer was at home. This is especially so if the user learns of the one-day sale while he/she is travelling in close proximity to the store where the sale is taking place. But advertising content is typically delivered without regard to the location of the user. For example, an advertisement may be delivered by a radio broadcast station for a given product or service, and the advertisement will reach all listeners within a relatively large geographic area (e.g., southeastern Michigan). But at the present time, there is no way to better target the placement of advertisements so that the advertisements are likely to reach consumers, such as listeners travelling in motor vehicles, at specific times when the listeners are most likely to act on an advertisement.

The challenge then becomes how to provide targeted advertisements or targeted content to consumers in a way that is highly timely and geographically targeted, and which maximizes the chance that the consumer will be able to act on the advertisement.

SUMMARY

In one aspect the present disclosure relates to a system for inserting stored advertising content into broadcast content being received and played over an audio system. The system may have a smartphone in wireless communication with the audio system which runs an application relating to a specific broadcast station that is broadcasting the broadcast content. The audio system may have a processing system for detecting breaks in program content that forms part of the broadcast content. The audio system may further be configured to obtain predetermined advertisements and to play back the predetermined advertisements over the audio system during each break in the program content, in place of advertisements contained in the broadcast content.

In another aspect the present disclosure relates to a system for inserting stored advertising content into broadcast content being received and played over an audio system. The system may comprise a smartphone in wireless communication with the audio system. The smartphone may be configured to run an application relating to a specific broadcast station that is broadcasting the broadcast content. The audio system may include a processing system for detecting a start point and an ending point of a break in program content being received by the audio system via the broadcast content. The audio system further is configured to communicate with the smartphone and to inform the smartphone to start the application when the audio system detects that the broadcast content from the specific broadcast station is being received. The audio system may further be configured to obtain predetermined advertisements using the smartphone and to play back the predetermined advertisements over the audio system during each break in program content in place of advertisements contained in the broadcast content, and then to resume playing the program content when the ending point of the break in program content is detected.

In still another aspect the present disclosure relates to a method for inserting stored advertising content into broadcast content being played over an audio system. The method may comprise using a smartphone to establish a wireless communication link with the audio system and configuring the smartphone to run an application relating to a specific broadcast station that is broadcasting the broadcast content. A processing system of the audio system may be used to detect breaks in program content that forms part of the broadcast content. The audio system may further be used to obtain predetermined advertisements and to play back the predetermined advertisements over the audio system during each break in the program content of the broadcast content, in place of advertisements contained in the broadcast content being broadcast by the specific broadcast station.

BRIEF DESCRIPTION OF THE DRAWINGS

The drawings described herein are for illustration purposes only and are not intended to limit the scope of the present disclosure in any way. In the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
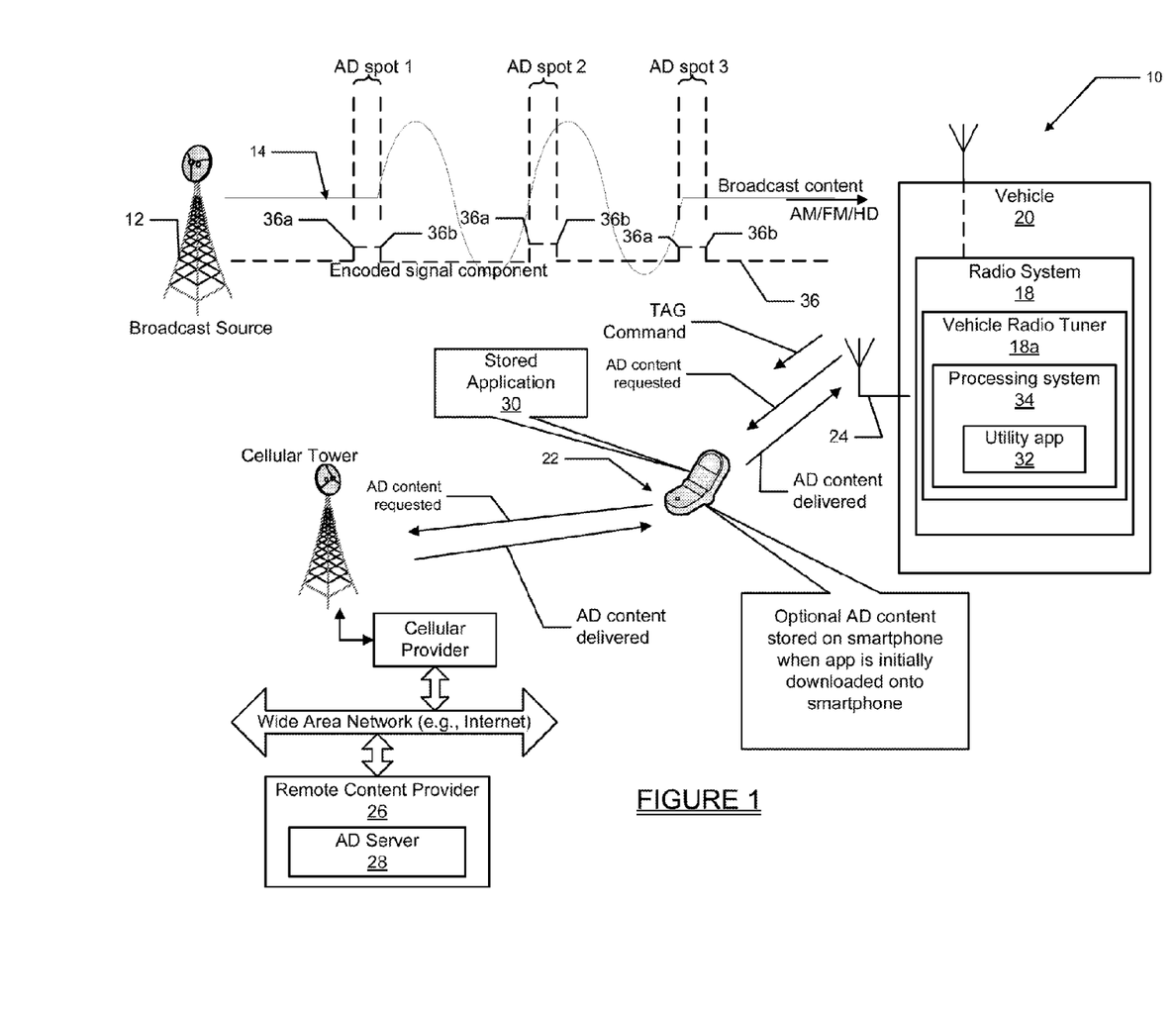
FIG. 1 is a high level block diagram illustration of a system in accordance with one embodiment of the present disclosure in which predetermined AD content is able to be seamlessly "inserted" into a broadcast signal being received at a vehicle radio of a vehicle, using the vehicle operator's cell phone to provide the predetermined AD content.

Referring to FIG. 1, there is shown a system 10 in accordance with one embodiment of the present disclosure for switching between playback of predetermined AD content and a broadcast signal being received. The system 10 may involve the use of a broadcast source 12 which transmits a broadcast signal 14 (AM/FM or HD radio). Simply for the purpose of explanation, it will be assumed that the broadcast signal 14 is an FM signal. The broadcast signal 14 is received by an antenna 16 associated with a vehicle radio tuner 18a of a radio system 18 within a vehicle 20 which an individual may be operating. The individual has a cellular phone 22, which in this example is a "smartphone" having its own processing, memory and wireless communications capabilities, as well known in the art.

The smartphone 22 is in contact with the vehicle radio tuner 18a through a wireless communications link with a second antenna 24, which may be designed to receive low power signals such as those used in accordance with the BLUETOOTH® wireless communications protocol. The smartphone 22 is also in wireless contact with a remote AD content provider 26 operating an AD server 28. The smartphone 22 may also include an application 30 stored in a memory thereof that the user has downloaded from a source of applications (not shown). The application 30 may relate to a particular broadcast source (i.e., radio station) that the user likes to listen to. Thus, the application 30 may be for a specific broadcast source, just for example a broadcast source having call letters WZZZ associated with FM frequency 105.1 MHZ in the metro Detroit, Mich. area. The application 30 may also operate to control the smartphone 22 to contact the remote AD content provider 26 and obtain specific AD content that has been created for specific types/classes of listeners of the broadcast source 12. In this regard, the initial downloading of the application may also involve having the user answer specific questions about the user's age, gender, profession/occupation, and other interests, which criteria may be used by the remote content provider 26 in more finely tailoring the supply of AD content to the user from the AD server 28. Also, an application could just use any information already available, such as the type of car, location information, or information from linked accounts. An application could also automatically determine this information through a third party such as the Facebook® social networking site, or any other social media. An example of a linked account could be a Google Corporation mail ("Gmail") account linked to an Android operating system based smartphone.

Optionally, a quantity of AD content may be provided when the application 30 is first downloaded onto the user's smartphone 22 so that the smartphone does not need to make a wireless connection with the remote content provider 26.

The vehicle radio tuner 18a may also have stored thereon a utility application 32 (i.e., software program) that is stored in a suitable memory (e.g., RAM) of a processing system 34 of the tuner. Alternatively, it will be appreciated that the processing system 34 and the utility application 32 could be part of a completely independent electronic subsystem which is independent of the vehicle's radio system 18, and which is interfaced to the vehicle's 20 electronics as needed to interact with the radio system 20 (e.g., through an auxiliary "IN" port). The utility application 32 may be started when the radio system 18 is turned on or when the vehicle 20 is started.

The utility application 32 may use the low power, wireless BLUETOOTH® communications link between it and the smartphone 22 to inform the smartphone when the user has selected a radio station that corresponds to the stored application 30. In this example, the selected radio station would be WZZZ and the stored application corresponds to the WZZZ radio station. This causes the processing system 34 to begin monitoring the broadcast signal 14, and more specifically an encoded signal component 36 that is mixed in to the broadcast signal. In one example the encoded signal component may be an encoded harmonic signal component, provided that the broadcast signal 14 is an AM or FM analog broadcast. Otherwise, the encoded signal component 36 could simply be low magnitude digital pulses in an HD broadcast (i.e., not audibly perceptible to the user but still detectable with suitable electronic D/A detector circuitry). Still further, the encoded composite signal could be present in a sub-band within the HD1, HD2 or FM RDS stream (i.e., not in the same audio stream that the audio broadcast is played through). Simply for the purpose of providing one example implementation, the encoded signal component will be assumed to be an FM signal, with the encoded signal component 36 being a "harmonic signal component."

The processing system 34 uses the utility application 32 to detect specific "markers" that are modulated in the harmonic signal component 36 of the broadcast signal 14 along with the primary audio signal content. In this regard it will be appreciated that the harmonic signal component 36 is transmitted concurrently with, and forms a portion of, the broadcast signal 14, but will be inaudible when the broadcast signal 14 is played back by the vehicle's radio system 18. The harmonic signal component 36 may be detected and monitored by the processing system 34 of the radio tuner 18a using band pass techniques or signal level detection techniques, or any other suitable means of detection. It is important to emphasize, however, that the harmonic signal component 36 does not degrade or otherwise audibly influence the playback of the audio content that is provided via the broadcast signal 14. In other words, the presence of the harmonic signal component 36 will not be apparent to the user who is listening to the playback of the broadcast signal 14 via the radio system 20.

With further reference to FIG. 1, merely for simplicity, the harmonic signal component 36 is illustrated as a digital waveform having a plurality of pulses that appear during times where an "AD spot" is present. A leading edge 36a of each pulse of the harmonic signal component 36 defines a "Start Marker" and the trailing edge 36b of each pulse defines an "End Marker". A duration between the Start Marker 36a and the Stop Marker 36b defines a time space that is concurrent with an "AD spot", or in other words a time slot corresponding to a commercial break where the broadcast source 12 would normally insert AD content into the broadcast signal 14. The Start Marker 36a is used by the utility application 32 and the processing system 34 to detect, in real time, that specific point in the broadcast signal 14 where the broadcast source 12 is starting a commercial break period and inserting AD content into its broadcast signal 14. Likewise, the Stop marker 36b defines that specific point in time in the broadcast signal 14 where the broadcast source 12 ends the commercial break (i.e., the AD spot) and begins retransmitting its primary content (e.g., music, talk radio, etc.).

It will also be appreciated that if an HD digital signal is being broadcast by the broadcast source 12, a "TAG" command could be selected from a suitable TAG command button on the vehicle radio, or possibly from the user's smartphone 22, to indicate that the specific content being received (e.g., song) is to purchased or otherwise identified for some other additional use at a later date/time. Another significant feature of the system 10 is the ability to track the location of the user's smartphone 22, and thus the real time location of the vehicle 20, using conventional location determining techniques. Such conventional techniques may involve triangulation with signal strength information provided from multiple cellular towers that are in range of the smartphone 22 and/or signals from satellites of the Global Positioning Satellite (GPS) system. Based on the determined real time location of the vehicle 20, the remote content provider 26 can even further tailor AD content provided from the AD server 28 so that specific restaurants, businesses or entertainment venues that are within a predetermined range (e.g., 5 miles) of the user's present location are provided during the AD spots.

Figure 2:
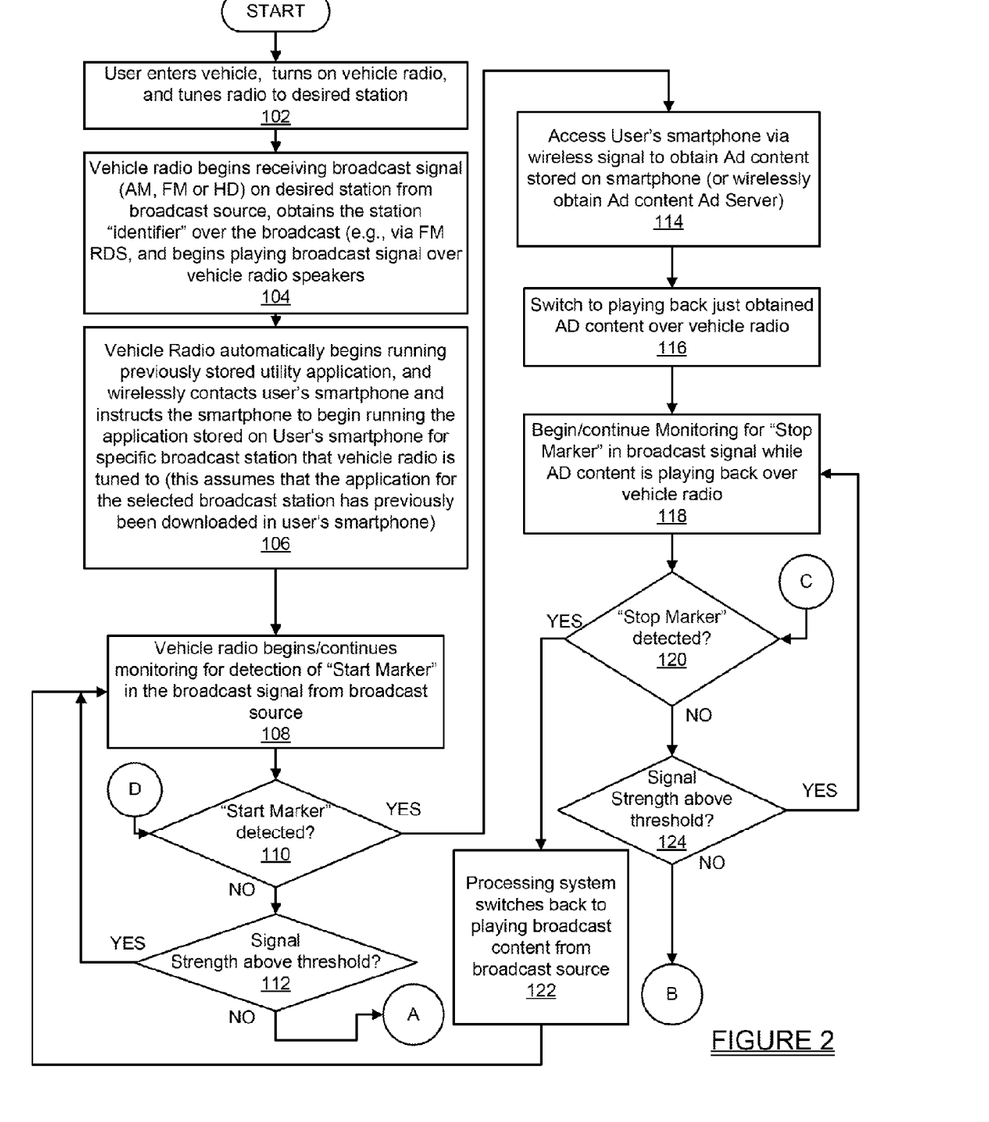
FIGS. 2 and 3 represent a high level flowchart of operations that may be performed by the system of FIG. 1 in inserting AD content into a broadcast signal being received and played back on a vehicle radio.

Referring now to FIG. 2, a flowchart 100 is shown describing in greater detail the operations that have summarized above which are being performed by the system 10. At operation 102 the user enters her/his vehicle, turns on the radio system and tunes to a desired station. For this example it will be assumed that the desired station is the WZZZ FM radio station mentioned above. At operation 104 the vehicle radio begins receiving the broadcast signal content from the WZZZ broadcast station 12, and then obtains the RDS information for the selected station, and then begins playing the received content over the radio system's speakers. If an HD signal is being received, the station identifying information can be presented through the HD radio feed. Again, it will be assumed for this example that an FM signal is being received. The station identifying information may include the call sign for the received station, and possibly additional information like location for a station or possibly some other unique identifying information.

At operation 106 the vehicle radio system 18 automatically begins running the previously stored utility application 32 and wirelessly contacts the user's smartphone 22 via the BLUETOOTH® communications link. The utility application 32 may automatically instruct the smartphone 22 to begin running the application 30 stored on the smartphone for the specific broadcast station that the vehicle radio system 18 is tuned to. Alternatively, the user may be required to manually start the application 30 stored on the smartphone 22. In this example the application 30 will be for the WZZZ radio station and it will be assumed that the smartphone 22 and the application 30 possess the functionality required to be started automatically by a suitable wireless signal received from the radio system 18.

At operation 108 the processing system 34 and the utility application 32 begin monitoring for the detection of a "Start Marker" in the FM broadcast signal 14 being broadcast from the broadcast source 12. At operation 110 a check is made if the "Start Marker" 36a has been detected. If not, then a check is made if the signal strength of the received broadcast signal 14 is above a predetermined minimum threshold, as indicated at operation 112. If it is, then operation 108 is repeated. If the check at operation 110 indicates that the "Start Marker" 36a has been detected, then at operation 114 the utility application 32 accesses the user's smartphone 22 via the BLUETOOTH wireless communications link with the smartphone to obtain AD content stored on the smartphone. This involves the smartphone 22 contacting the remote content provider 26 to obtain the specific AD content from the AD server 28. Optionally the AD content could be stored in the smartphone's 22 memory and provided therefrom to the processing system 34. At operation 116 the processing system 34 controls the switching of the radio system 18 so that the AD content just obtained from the smartphone 22 may be played back over the vehicle's radio system 20, as indicated at operation 116.

Figure 3:
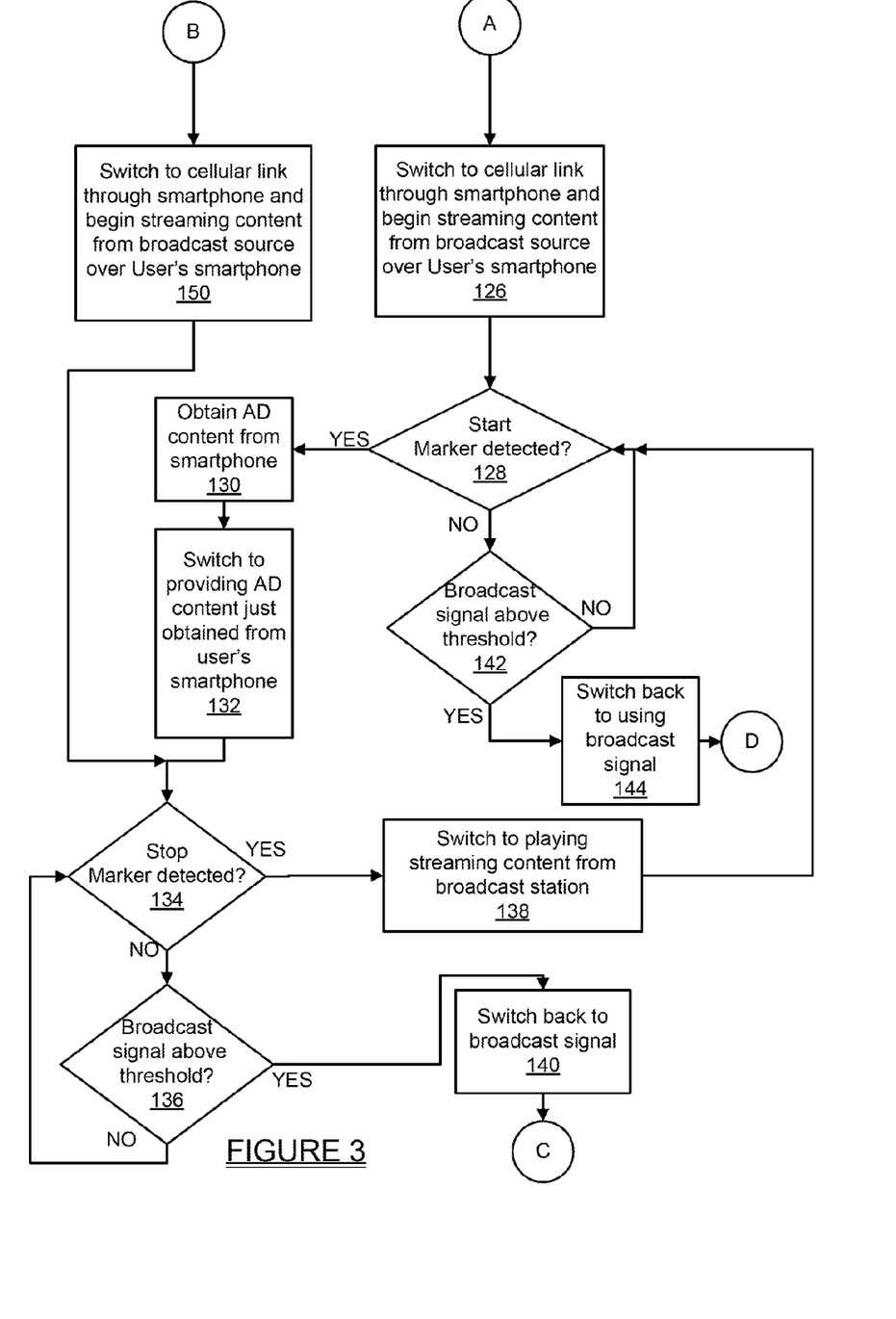

At this point, the processing system 34 will begin (or continue) monitoring for a "Stop Marker" 36b in the broadcast signal 14, as indicated at operation 118. This involves making a check for the "Stop Marker" 36b, as indicated at operation 120. If a "Stop Marker" is detected at operation 120, then the processing system 34 switches back to playing broadcast content from the broadcast source 12 (i.e., content delivered via broadcast signal 14), as indicated at operation 122. Alternatively, a "Stop Marker" or "end-of-file" indication may also be received from the smartphone 22 that tells the processing system 34 and the utility application 32 that the AD content being supplied by it has concluded. Both types of signal detection are contemplated as being handled at operation 120. Operation 108 is then repeated to start checking again for the next "Start Marker" 36a. If the check at operation 120 does not detect a "Stop Marker" 36b, then a check is made if the signal strength of the broadcast signal 14 is above the predetermined threshold, as indicated at operation 124. If this check produces a "YES" answer, then operation 118 is repeated. If it produces a "NO" answer, then operation 150 in FIG. 3 is performed. Similarly, if the signal strength check at operation 112 produces a "NO" answer, then operation 126 in FIG. 3 is performed.

Referring to FIG. 3, and as noted above, if either of the checks at operations 112 or 124 indicate that the signal strength has dropped below the predetermined threshold, then the processing system 34 knows to begin providing the broadcast content from a streaming signal source (not shown in FIG. 1). This assumes that the broadcast station WZZZ in this example also streams its broadcast over a wide area network, for example the Internet. At operation 126 then, the processing system 34 begins also receiving the streaming broadcast and then begins checking for a "Start Marker" in the streamed signal. In this example the streamed digital signal will also have some form of signal component by which a "Start Marker" may be included in the digital signal without otherwise affecting the quality of the played back signal content. At operation 128 a check is made if the "Start Marker" in the streamed signal is present, and if it has been detected, then the AD content is obtained from the user's smartphone for playback at operation 130. At operation 132 the processing system 34 switches to providing the AD content just obtained from the user's smartphone 22. At operation 134 the processing system 34 then starts checking for the presence of a "Stop Marker" in the streaming digital signal being received. If the check at operation 134 detects that a "Stop Marker" has been received, the processing system 34 will then switch back to playing the streaming digital content from the broadcast station, as indicated at operation 138. Again, the "Stop Marker" may have been received directly from the smartphone 22 or an end-of-file indication supplied by the Smartphone to indicate that the AD content has finished. Operation 128 will then be repeated. If the check at operation 134 indicates the "Stop Marker" has not been detected, then a check is made at operation 136 to see if the signal strength of broadcast signal 14 is back above the predetermined minimum threshold. If it is, then at operation 140 the processing system switches back to using the broadcast signal 14, and then jumps back to operation 120 in FIG. 2.

If the "Start Marker" was not detected at operation 128 in FIG. 3, then a check is made if the signal strength of the broadcast signal is above the minimum predetermined threshold, as indicated at operation 142. If it is, then the processing system 34 switches back to using the broadcast signal 14, and then operation 110 in FIG. 2 is repeated.

From the foregoing it will be appreciated that the present system 10 and method is able to receive a broadcast signal and to monitor automatically switch back and forth between playing the content provided via the broadcast signal and playing highly tailored AD content from an independent source of AD content. Importantly, the AD content obtained from the independent source of AD content is only played during those times of the broadcast signal where commercial breaks would ordinarily be occurring. The system 10 and method further automatically and seamlessly detects when the commercial break periods are beginning and when they end, so that the user is able to receive the programming content (e.g., music, talk radio, etc.) from the broadcast source without interruption. The system and method further is able to provide highly tailored AD content based on the real time location of the user, when this feature is implemented in the system 10. Still further, the system and method is able to automatically and seamlessly switch between the broadcast signal and a streaming digital signal, in the event the signal strength of the broadcast signal form the broadcast source becomes too weak to receive. The highly tailored AD content is tailored for each specific user, and enables advertisers to even more effectively promote their products and services to specific listeners.

Figure 4:
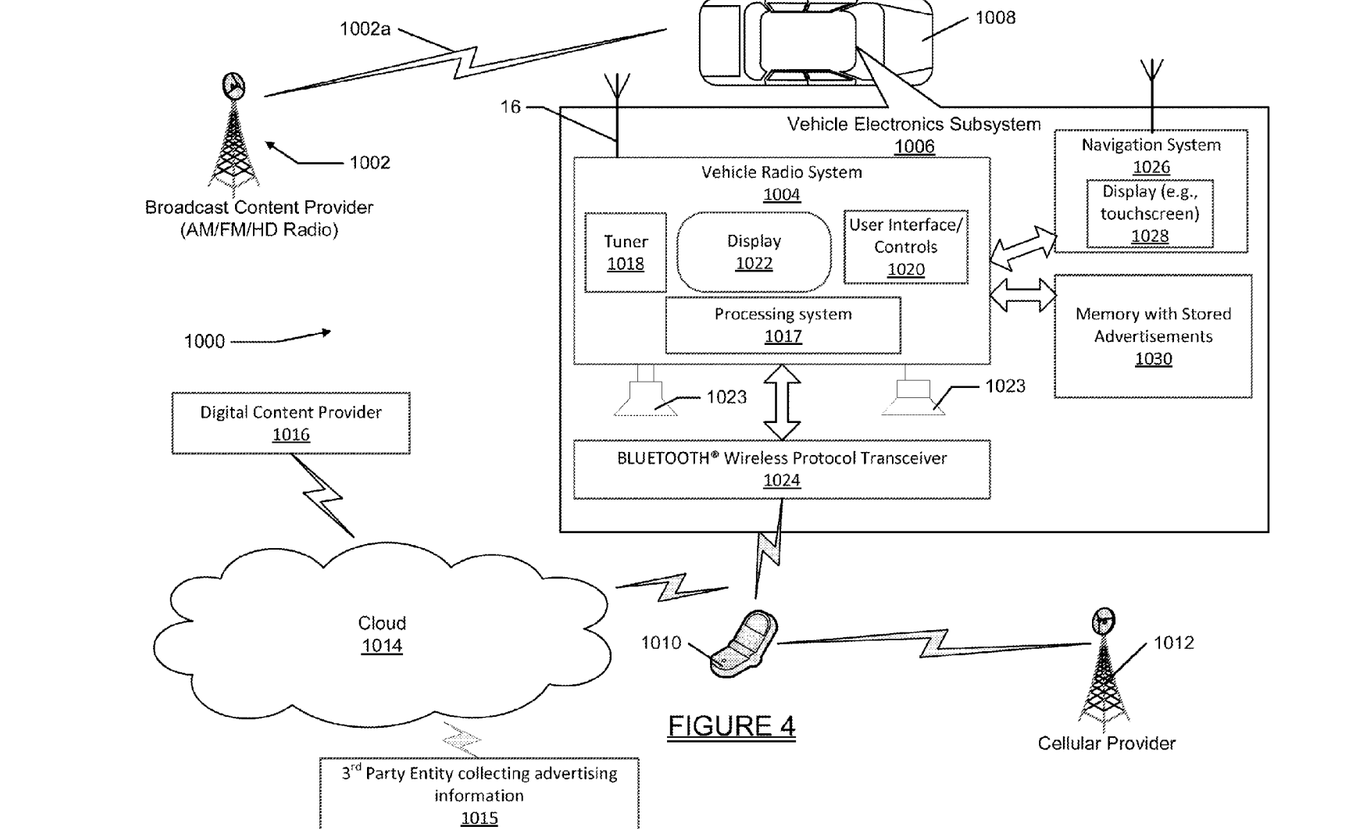
FIG. 4 is a high level block diagram of a system in accordance with one embodiment of the present disclosure for delivering real time, geographically targeted advertisements to an individual travelling in a motor vehicle.

Referring to FIG. 4, a system 1000 is shown in accordance with another embodiment of the present disclosure. The system 1000 provides the added important feature of serving up stored advertisements, during commercial break periods, that are relevant to the geographic area in which the user is present while the user is travelling in a motor vehicle.

In FIG. 4 a broadcast station 1002 broadcasts content such AM/FM content, HD radio content, etc., that is received by a vehicle radio system 1004 of a vehicle electronics subsystem 1006. The vehicle electronics subsystem 1006 is located within a motor vehicle 1008. A user's smartphone 1010 may also be in wireless communication with the vehicle radio system 1004, as well as a cellular provider 1012, and one or more entities via the cloud 1014. One such entity is indicated as a digital content provider 1016, although it will be appreciated that virtually any entity that is able to communicate with the user through his/her smartphone could potentially be accessed via the cloud 1014. Another such entity could be a third party 1015 that collects information on advertisements that are acted on by the user of the vehicle 1008, as will be explained in greater detail in the following paragraphs.

The vehicle electronics subsystem 1006 may include a processing system 1017, a tuner 1018, a user interface/control subsystem 1020, a display 1022, and one or more speakers 1023. The vehicle radio subsystem 1004 may be in communication with a short range wireless transceiver 1024, such as a BLUETOOTH® wireless protocol transceiver 1024. For convenience, transceiver 1024 will be referred to throughout the following discussion as the "BLUETOOTH® wireless protocol transceiver 1024." The BLUETOOTH® wireless protocol transceiver 1024 may be used to create a wireless communications link between the user's smartphone 1010 and the vehicle radio system 1004. In this manner content delivered via the cloud 1014, or via any other remote entity, may be relayed to the vehicle radio system 1004 either for immediate playback or stored for playback at a later time.

The vehicle radio system 1006 also may include a navigation system 1026 having a display 1028. The display 1028 may be a touchscreen display. A memory 1030 may be used to store pre-loaded advertisements pertaining to various establishments. For example, such advertisements may be from retail establishments such as department stores, coffee shops, automotive dealerships or tune-up/repair facilities, restaurants, health clubs, grocery stores, home improvement stores, car washes or detailing shops, or virtually any other establishment that offers a product or service that might be useful to the user. Advertisements from any or all such establishments may be pre-loaded into the memory from some external database using the BLUETOOTH wireless protocol transceiver 1024 either at the time of purchase of the vehicle, when the vehicle is serviced at a dealership, or even periodically using advertising content obtained by the user's smartphone via the cloud 1014. For example, various Internet search engine companies (Google, Inc. and Yahoo, Inc.) allow provide maps which have retail and other establishments indicated thereon. Accessing such maps periodically in real time may permit the establishments for which advertisements are stored in the memory 1030 to be updated to reflect those establishments that are within a reasonably close geographic proximity to the user at any given time. Therefore, as the user drives from one city to another during a long drive, the advertisements stored in the memory 1030 that are available for playback are continuously updated to reflect those establishments that reasonably close in proximity to the user. The reasonable proximity may vary, but it is anticipated that advertisements corresponding to establishments located within at least 5-10 miles of the real time location of the user may be stored in the memory 1030.

The navigation system 1026 may periodically report the location of the vehicle 1008 to the vehicle's radio system 1004 as the user is operating the vehicle 1008. It will be appreciated that the smartphone 1010 may also have a navigation application thereon which can periodically provide real time data on the precise location of the vehicle 1008 to the vehicle radio system 1004.

The system 1000 may operate to detect when a commercial break is beginning in a broadcast signal 1002a in the same way as described herein in connection with the system 10 and methodology related to FIGS. 1-3. The detailed description of that operation will not be repeated here for system 1000. Accordingly, and with reference to flowchart 1100 of FIG. 5, during operation the vehicle radio system 1004 will be receiving broadcasted content from the content provider 1002 via wireless signal 1002*a*, as indicated at operation 1102. The processing system 1017 of the vehicle radio system 1004 detects a commercial break, or that a commercial break is about to occur, in the broadcast content, as indicated at operation 1104. At operation 1106 the processing system 1017 of the vehicle radio system 1004 may obtain real time location information for the vehicle 1008 from the navigation system 1026. Alternatively the location information could be provided by a navigation application running on the user's smartphone 1010.

Figure 5:
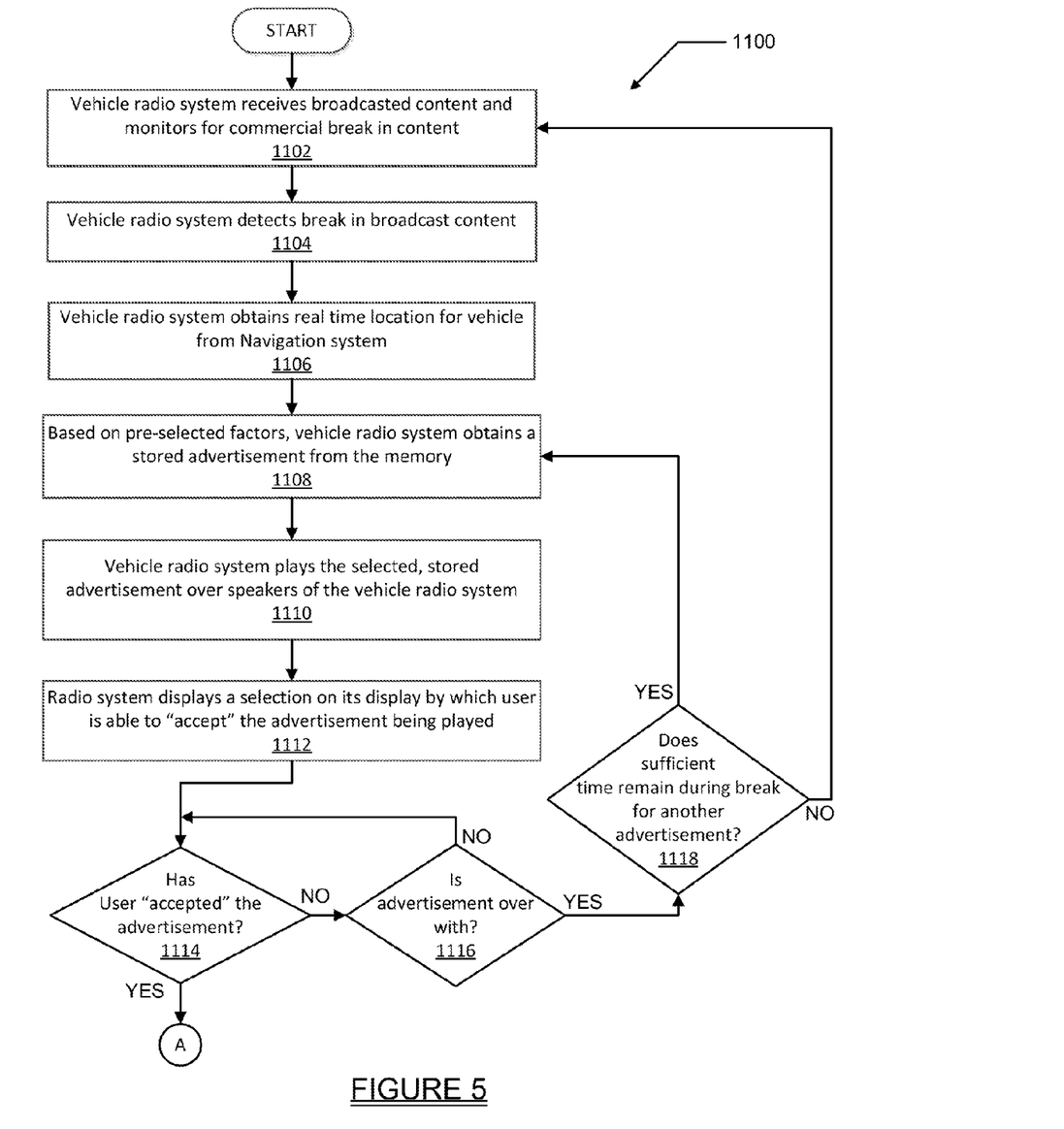
FIGS. 5 and 6 are a flowchart of one example of a sequence of operations that may be performed by the system of FIG. 4 in delivering the real time geographically targeted advertisements.

At operation 1108 the processing system 1017 selects one of a plurality of available stored advertisements from the memory 1030 so that the selected advertisement may be inserted into the broadcast and played back using the radio system 1004 during the commercial break in the broadcast. The precise selection of the stored advertisement may be based on any hierarchy of factors. For example, the vehicle's 1008 proximity to the establishments corresponding to the available advertisements may be given priority. Therefore, when an opportunity to select an advertisement from the memory 1030 becomes available, whichever advertisement is associated with the establishment closest to the vehicle's location at that time may be selected first by the processing system 1017 for insertion and playback over the vehicle radio system 1004.

Another factor that may be considered is the direction that the vehicle 1008 is travelling when the opportunity arises to select an advertisement. This factor may be considered in tandem with the above discussed factor of vehicle proximity to the establishments for which advertisements are available. For example, the navigation system 1026 may provide information to the processing system 1017 on the direction that the vehicle 1008 is currently travelling, and such information may also be considered by the processing system 1017 in weighing which one of two or more available advertisements to select. In this manner, advertisements associated with establishments that are located ahead of the vehicle's 1008 current path of travel, that is, establishments that the vehicle 1008 is moving towards, may be given priority over those establishments that the vehicle 1008 has passed and is moving away from.

Still another means of prioritizing the selection of available advertisements may be based on a hierarchy of different types of establishments for which advertisements are available. For example, food establishments such as fast food restaurants, sandwich shops and coffee shops may have the highest priority, retail establishments such as consumer electronics stores and department stores may have a lesser priority, and establishments relating to auto care may have still an even lower priority. Virtually any type of hierarchy could be employed to help decide which advertisements to serve up for playback when the opportunity arises. Those skilled in the art will appreciate that establishments could also opt to pay a small fee to give their advertisements priority over other advertisers.

At operation 1110 the vehicle radio system 1004 plays the selected advertisement over the speakers 1023. At operation 1112 the vehicle radio system 1004 may display a selection on its display 1022 by which the user may "accept" the advertisement being played. By "accept" it is meant that the user can use the user interface/controls 1020 to input a command that the user wishes to accept the advertisements and proceed toward the establishment associated with the advertisement. Such a selection may also be made available from the display 1022 if the display is a touchscreen display, or possibly from the display 1028 of the navigation system 1026, or possibly even from the display on the user's smartphone 1010. At operation 1114 the vehicle radio system 1004, and more specifically the processing system 1017, begins checking for an input from the user. If no response is received, then a check is made if the advertisement being played back has ended, as indicated at operation 1116. If the answer to this check is "No", then operation 1114 is repeated until either the currently playing advertisement has ended or an "acceptance" of the advertisement has been received.

If the check at operation 1116 indicates the currently playing advertisement has ended, then a check may be made at operation 1118 to determine if sufficient time is available to play another advertisement. This is assuming, of course, that the vehicle 1008 is in proximity to another establishment that has an advertisement available for playback. Advertisements could also be organized according to length (e.g., 30 seconds, 15 seconds, etc.) so that if only a limited amount of time remains during the commercial break (e.g., maybe 15 seconds), then only those advertisements that would be short enough in time to be played back during the remaining time available will be considered by the processing system 1017 for selection.

If the check at operation 1118 indicates that sufficient time is available for playing back at least one more stored advertisement, then operations 1108-1114 may be repeated. If the check at operation 1118 indicates that insufficient time remains to play back another advertisement during the current commercial break, then the vehicle radio system 1004 resumes receiving broadcasted content, as indicated at operation 1002.

Figure 6:
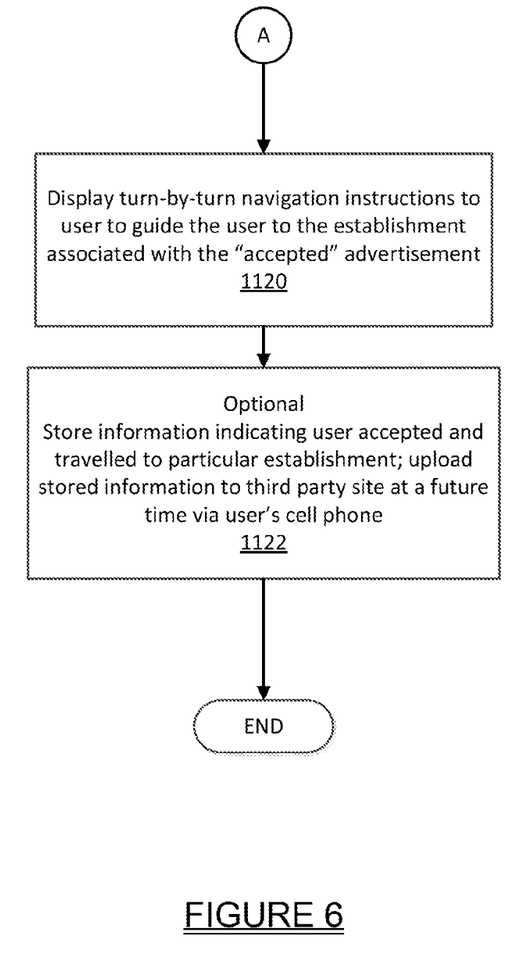

Referring further to FIGS. 5 and 6, if the check at operation 1114 indicates that the user has "accepted" an advertisement being played back on the vehicle radio system 1004, then the navigation system 1026 may use its stored maps to display turn-by-turn directions on its display 1028 which direct the user to the establishment associated with the advertisement the user has just selected, as indicated at operation 1120. This is a significant advantage of the system 1000 of the present disclosure. Without this feature, the user would typically need to begin searching with the navigation system 1026, or possibly with his/her smartphone 1010, to obtain the address of the establishment. It will be appreciated that this can be a significant distraction to the individual while the individual is operating the vehicle 1008. This is especially so if the user is travelling in an area that the user is not familiar with. Providing the user with the ability to "accept" an advertisement, using a single command entered via the user interface/controls 1020 or via the navigation system 1026, and then automatically providing the user with detailed turn-by-turn directions to the establishment associated with the advertisement, significantly eases the burden on the user in navigating to the establishment and taking advantage of the advertisement.

An optional operation is illustrated at operation 1122. Optional operation 1122 may be implemented to store information indicating that the user accepted and travelled to a particular establishment. In one implementation, upon arrival at the destination, the system 1000 would be notified of the arrival by a signal from the navigation system. Such information could be stored in the memory 1030 upon the arrival of the user at the destination establishment. The information could be uploaded from the memory 1030, using the smartphone 1010, to a third party advertisement tracking site, such as entity 1015 in FIG. 4, at a future day/time. This information could enable advertisers to more effectively gauge how their advertisements are being received by consumers.

The present disclosure also enables advertisers to more effectively market "limited time" advertising offers to consumers that are already travelling in their vehicles, and in close proximity to a physical establishment associated with the advertiser. For example, a coffee shop could have an advertisement offering a $1.00 large coffee drink to a user for those advertisements that it knows will be delivered via the system 1000. The strategy here would be to encourage consumers to visit the advertiser's establishment to try a product or service when it is known that the consumer is in close proximity to the establishment Integrated Payment Subsystem In still another implementation the system 1000 may incorporate an automatic payment system to allow the user to actually purchase the product associated with an advertisement that the user had previously "accepted". For example, if the user selects an advertisement that is being provided on the radio system 1004, a notification may be sent to the business establishment via the user's smartphone 1010. The business establishment may then debit the user's credit card (assuming this information is on file with the business establishment), and the product, for example a $1.00 large coffee, will be waiting for the customer when she/he arrives at the business establishment. Optionally, the business establishment may send back a confirmation number to the user's smartphone 1010 that the user can present to the business establishment worker to confirm that she/he is the correct customer to be receiving the $1.00 large coffee when it is delivered to the user.

Figure 7:
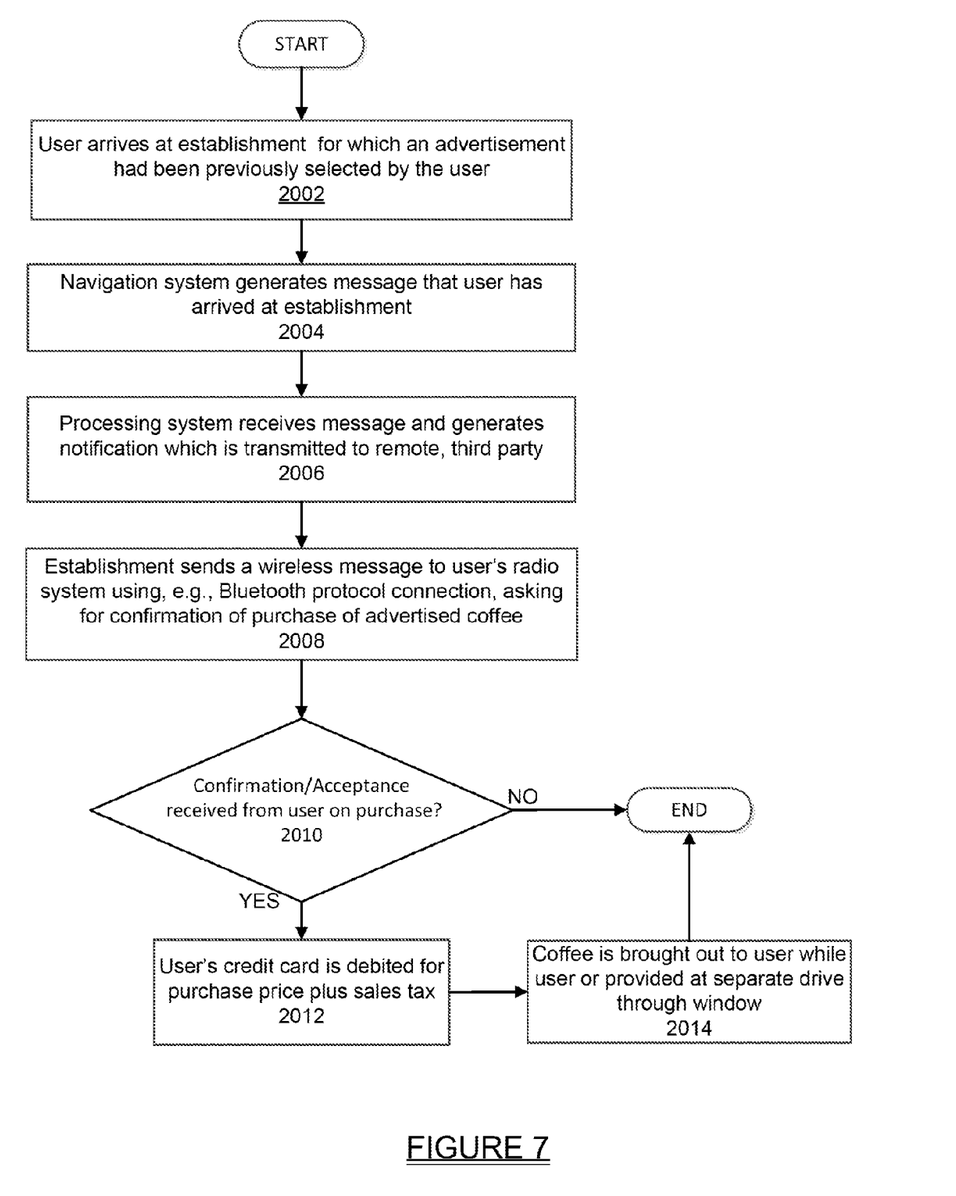
FIG. 7 is a flowchart of another example of a series of operations that may be performed by the system of FIG. 4 in delivering the real time geographically targeted advertisements.

Another variation of this sequence is shown in the flowchart 2000 of FIG. 7. In this example assume that the user has just arrived at the establishment (i.e., a coffee shop) that he previously selected to travel to, as indicated at operation 2002, but has not yet actually confirmed a purchase of the $1.00 large coffee. When the user arrives at the coffee shop the navigation system 1026 may send a message to the radio system 1000, for example to the processing system 1017, to generate and transmit a message indicating the arrival of the user at the selected establishment, as indicated at operation 2004. At operation 2006 the processing system 1017 may receive the message and then generate a notification which is transmitted to a remote, third party, as indicated at operation 2006. This apprises the remote, third party, for example an advertising tracking company, that the user has actually accepted an advertisement received over the user's radio system and travelled to the establishment associated with the advertisement.

At operation 2008 the establishment may then send a wireless message to the user's vehicle radio system 1004 asking for confirmation of the purchase associated with the previously accepted advertisement. So in this instance the request would be for a confirmation of the purchase of the $1.00 large coffee. The transmission may be via a short range, wireless connection, such as a Bluetooth protocol connection with the radio system 1004. Confirmation may be made by a "Purchase" option being displayed on the user's display 1022. If the display 1022 is a touchscreen, then when the user presses the selection a message will be transmitted back to the establishment. At operation 2010 an electronic payment system at the establishment monitors for the receipt of a confirmation of the purchase, and when such a confirmation is received, the user's credit card may be debited for the purchase price of the coffee plus sales tax, as indicated at operation 2012. Obviously, this assumes that the user has an account at the establishment and that her/his credit card information is electronically on-file at the establishment. The coffee may then be brought out to the user's vehicle, as indicated at operation 2014 or the user may simply drive up to the window of the establishment where payment is made in a drive through lane. Optionally, a confirmation number could be sent back to the user's smartphone that the user will be required to provide to the coffee shop worker who delivers the coffee to the user.

Fundraising/Charitable Payment Example

Another example similar to the above product purchase scenario given above may involve facilitating the payment of a political or charitable donation. In this example, a charitable or political donation advertisement is played on the user's radio system 1004 and a selection, for example "GIVE NOW", is presented on the display 1022. For example, the advertisement may be generated when the user's vehicle comes within proximity to an establishment of the charity, or possibly even in proximity to a single worker (e.g., Salvation Army worker standing on a street corner taking donations) located in the vicinity. Or the advertisement may be associated with the political party that sponsored the advertisement. In either event, the user may select the "GIVE NOW" advertisement, and personal information associated with the user (for example name and address), which is stored in the user's radio system 1004 or in other memory of the vehicle electronics subsystem 1006, is then transmitted back to a web site associated with the charitable or political advertisement. The political or charitable organization associated with the advertisement may then send an invoice directly to the user's smartphone 1010. Alternatively, if personal and billing information is already on file at the charitable or political organization, then the user's credit card may be automatically debited when the user selects the "GIVE NOW" selection and the selection acceptance is transmitted by the user's smartphone 1010.

The present disclosure thus provides a means by which advertisements can be selectively provided to users traveling in motor vehicles (e.g., cars, trucks, vans, etc.). Importantly, the various embodiments of the present disclosure provide the selected advertisements in a manner that may significantly increase the likelihood that the user will act on the advertisement, as well as significantly aid the user in travelling to the establishment associated with the advertisement.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

The invention claimed is:

1. A system for inserting stored advertising content into broadcast content being played over an audio system, wherein the audio system is receiving at least one of AM or FM transmissions from a broadcast source that contains the broadcast content, the system comprising:

a smartphone in wireless communication with the audio system, the smartphone configured to run an application relating to a specific broadcast station that is broadcasting the broadcast content;

the smartphone further configured to communicate via a cellular network with a cellular provider to automatically obtain predetermined advertisements using the cellular network which are targeted to at least one of an interest of a user or a location of a user of the smartphone, and at least one of the smartphone and the audio system being configured to store the predetermined advertisements;

the audio system including a processing system configured to run thereon a stored utility application, the stored utility application configured to contact the smartphone and inform the smartphone when a user of the audio system has selected the specific broadcast station to receive content from, so that the application on the smartphone is started, and the audio system further being configured to detect breaks in program content that forms part of the broadcast content; and the audio system further being configured to obtain predetermined advertisements from the smartphone directly, and to play back the predetermined advertisements over the audio system during each said break in the program content of the broadcast content, in place of advertisements contained in the broadcast content being broadcast by the specific broadcast station.

2. The system of claim 1, wherein the processing system of the audio system is further configured to detect the breaks in the program content by detecting a presence of a start marker and a presence of an end marker in a modulated analog signal associated with the broadcast content.

3. The system of claim 1, wherein the processing system of the audio system selects from one of a plurality of the predetermined advertisements based on a real time location of the smartphone.

4. The system of claim 1, wherein the processing system of the audio system is configured to store the plurality of predetermined advertisements obtained by the smartphone.

5. The system of claim 1, wherein the smartphone is configured to store the plurality of predetermined advertisements.

6. The system of claim 1, wherein the audio system includes a display system which is configured to display information relating to specific ones of the plurality of predetermined advertisements being played back over the audio system, and further which is configured to enable a user to select a particular one of the predetermined advertisements being displayed; and wherein at least one of the audio system or the smartphone is configured to provide turn-by-turn directions to the user to direct the user to a business establishment associated with the selected particular one of the predetermined advertisements.

7. The system of claim 1, wherein the broadcast content being received by the audio system is one of an amplitude modulated (AM) signal or a frequency modulated (FM) signal, and wherein the audio system is configured to monitor a signal strength of the broadcast content being received by the audio system and to use the smartphone to obtain a digital stream of the broadcast content via a wide area network when the signal strength of the broadcast content drops below a predetermined value.

8. A system for inserting stored advertising content into broadcast content being played over an audio system, the system comprising:

a smartphone in wireless communication with the audio system, the smartphone configured to run an application stored thereon relating to a specific broadcast station that is broadcasting the broadcast content;

the audio system including a processing system running a utility application configured to detect a start point and an ending point of a break in program content being received by the audio system via the broadcast content;

the audio system further being configured to establish a wireless communications link with the smartphone to inform the smartphone to start the application when the audio system detects that the broadcast content from the specific broadcast station is being received;

the processing system of the audio system further being configured to automatically obtain predetermined advertisements using the smartphone and the wireless communications link between the smartphone and the audio system, and to play back the predetermined advertisements over the audio system during each said break in program content, in place of advertisements contained in the broadcast content being broadcast by the specific broadcast station, and then to resume playing the program content when the ending point of the break in program content is detected; and wherein the broadcast content being received by the audio system is one of an amplitude modulated (AM) signal or a frequency modulated (FM) signal, and wherein the system is configured to monitor a signal strength of the broadcast content being received by the audio system and to use the smartphone to obtain a digital stream of the broadcast content via a wide area network when the signal strength of the broadcast content drops below a predetermined value.

9. The system of claim 8, wherein the predetermined advertisements are stored on the smartphone.

10. The system of claim 8, wherein the predetermined advertisements are wirelessly obtained by the smartphone in real time from a remote source.

11. The system of claim 8, wherein the start point and the ending point which are detected are represented by encoded signal components in a harmonic signal component of the broadcast content.

12. The system of claim 8, wherein the system is further configured to track a real time location of the smartphone and to select ones of the predetermined advertisements based on the real time location of the smartphone.

13. The system of claim 8, wherein the audio system and the smartphone are configured to communicate via a short range wireless communications link established without user intervention.

14. The system of claim 13, wherein the audio system comprises a display system for displaying information pertaining to the predetermined advertisements as the predetermined advertisements are being played over the audio system; and wherein the audio system further includes a control by which a user selects the displayed information pertaining to a specific one of the advertisements being displayed on the display; and wherein at least one of the audio system or the smartphone generates turn-by-turn directions to a business establishment associated with the displayed information being selected by the user.

15. The system of claim 14, wherein the smartphone is configured to communicate, via a wireless wide area network, information relating to the advertisements having been selected by the user.

16. A method for inserting stored advertising content into broadcast content being played over an audio system, wherein the audio system receives at least one of AM or FM transmissions that include the broadcast content, the method comprising:

using a smartphone to establish a wireless communication link with the audio system;

further using the smartphone to communicate via a cellular network with a cellular provider to automatically obtain predetermined advertisements using the cellular network which are targeted to at least one of an interest or a location of a user of the smartphone, and which are stored on at least one of the smartphone and the audio system;

configuring the smartphone to run an application relating to a specific broadcast station that is broadcasting the broadcast content;

using a processing system of the audio system to run a utility application to detect breaks in program content that forms part of the broadcast content; and further using the processing system of the audio system to inform the application when the audio system has been tuned to the specific broadcast station, so that the application stored on the smartphone is started, and further to obtain predetermined advertisements using the application stored on the smartphone and to play back the predetermined advertisements using the processing system over the audio system during each said break in the program content of the broadcast content, in place of advertisements contained in the broadcast content being broadcast by the specific broadcast station.

17. The method of claim 16, wherein the predetermined advertisements are stored in a memory of the audio system.

18. The method of claim 16, wherein the predetermined advertisements are stored in the smartphone.

19. The method of claim 16, wherein the predetermined advertisements are selected based on a real time location of the smartphone.

20. The method of claim 19, wherein the audio system is configured to information pertaining to specific ones of the predetermined advertisements, and to present a user with a selection by which the user selects whether a specific one of the predetermined advertisements is to be acted upon, and when the user selects to act upon the specific one of the predetermined advertisements, at least one of the smartphone or the audio system is configured to provide the user with turn-by-turn directions to a business establishment associated with the selected specific one of the predetermined advertisements.

21. The method of claim 16, wherein the broadcast content being received by the audio system is one of an amplitude modulated (AM) signal or a frequency modulated (FM) signal, and wherein the audio system is configured to monitor a signal strength of the broadcast content being received by the audio system and to use the smartphone to obtain a digital stream of the broadcast content via a wide area network when the signal strength of the broadcast content drops below a predetermined value.

* * * * *